F. E. IVES.
PHOTOMETER.
APPLICATION FILED SEPT. 25, 1908.

914,282.

Patented Mar. 2, 1909.
2 SHEETS—SHEET 1.

Witnesses
H. L. Smith
H. D. Turner

Inventor
Frederic E. Ives
by his attorneys
Smith & Frazier

F. E. IVES.
PHOTOMETER.
APPLICATION FILED SEPT. 25, 1908.

914,282.

Patented Mar. 2, 1909.
2 SHEETS—SHEET 2.

Witnesses
Harry L. Smith
Hamilton D. Turner

Inventor
Frederic E. Ives
by his attorneys

UNITED STATES PATENT OFFICE.

FREDERIC E. IVES, OF WEEHAWKEN, NEW JERSEY.

PHOTOMETER.

No. 914,282.　　　　Specification of Letters Patent.　　　Patented March 2, 1909.

Application filed September 25, 1908. Serial No. 454,799.

*To all whom it may concern:*

Be it known that I, FREDERIC E. IVES, a citizen of the United States, residing in Woodcliffe-on-the-Hudson, Weehawken, New Jersey, have invented certain Improvements in Photometers, of which the following is a specification.

The object of my invention is to provide a convenient means wherewith to measure the relative luminosity of different sources of light or of objects either transparent or opaque, and more particularly to make and record separate measurements indicating the relative presence of three isolated bands of spectrum color in order that the records may indicate differences of hue as well as luminosity.

The device is designed to readily and quickly measure, without preliminary adjustment for personal color equation or quality of illumination, all tints or hues having smoothly graduated spectra, and is adapted for the measurement of difference in strength of solutions or spreads of color having the same kind of absorption spectra, thus providing for the standardizing of dyes, paints, etc., of definite composition, or for measuring the hues of water, oils, beers, paper pulps, and the like. The instrument does not take into account intermediate portions of the spectra of the object colors and consequently the records do not indicate with the same precision as in the color meter forming the subject of my prior patent No. 894,654, the relations of different colors having differently constituted broken or banded spectra, but where the tints are light, and the spectra of the colors smoothly graduated the records are substantially identical with those of said prior patented device and the elimination of preliminary adjustments for personal color equation and quality of illumination reduces the number of factors that have to be coördinated, while the difference of procedure resulting from the making of separate measurements for different parts of the color spectra and the greater simplicity of construction and operation of the device render it more convenient for use in those cases to which it is adapted.

Figure 3:
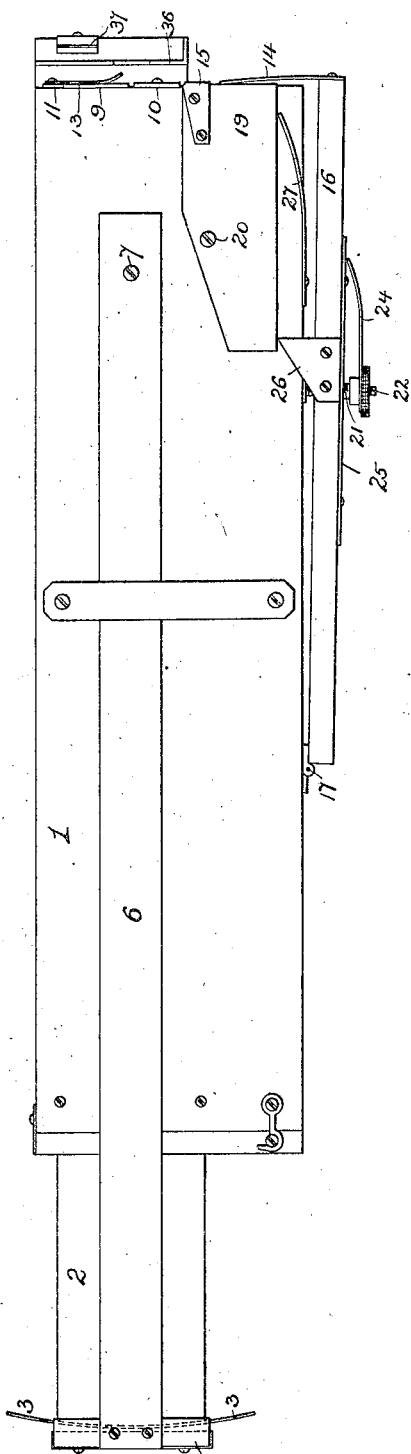
Figure 1:
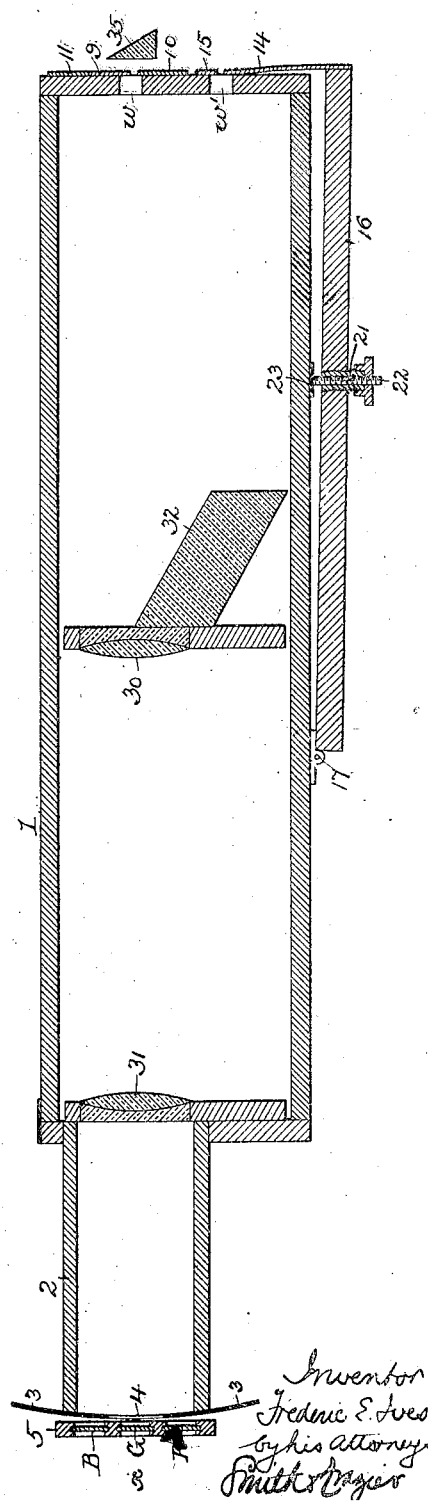
Figure 2:
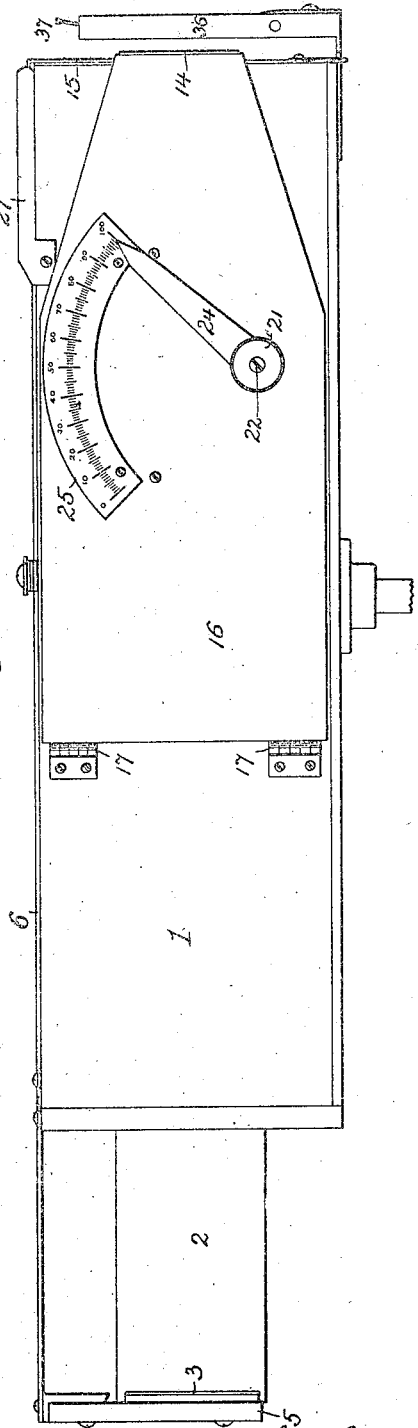
Figure 4:
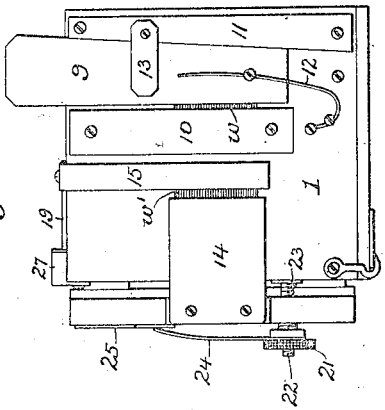

In the accompanying drawings—Figure 1 is a horizontal longitudinal section of my improved instrument; Fig. 2 is a side elevation of the same; Fig. 3 is a top or plan view, and Fig. 4 is an elevation of the front end of the instrument.

In the drawing, 1 represents the main casing of the instrument which may be of any suitable material and of rectangular or other shape in cross section, 2 representing the eye-piece tube and *x* the position of the eye in making observations. At the end of the eye-piece tube is a segmental plate 3 with central aperture 4 and mounted so as to swing across this aperture is a carrier 5 containing blue, green and red color screens, indicated respectively at B, G and R, these color screens being identical with those used in my previously patented color meter. The color screen carrier is, in the present instance, secured to an arm 6 pivoted upon the top of the casing 1 at 7. In the front end of the casing 1 are vertical slit apertures $w$ and $w'$, the area of the aperture $w$ being susceptible of variation by movement of a vertically sliding wedge-shaped shutter 9 in respect to a fixed plate 10. The shutter 9 bears against a fixed wedge 11 on the front of the casing and is held in contact therewith by means of a spring 12, another spring 13 serving to keep it in contact with the front end of the casing 1. The area of the aperture $w'$ can be varied by means of laterally adjustable shutters 14 and 15, the shutter 14 being carried by an arm 16 located at one side of the casing 1 and pivoted thereto at 17, and the shutter 15 being carried by a lever 19, pivoted at 20, to the top of the casing 1.

Adapted to an opening in the arm 16 is a micrometer screw 21 in which is formed a threaded opening for the reception of another screw 22, the latter bearing against a plate 23 on the side of the casing 1, as shown in Fig. 1. The micrometer screw 21 carries a pointer 24 which operates in connection with a graduated scale 25 on the side of the casing, and the arm 16 is provided with a projecting lug 26 which bears upon the lever 19 near the rear end of the same, a spring 27 bearing upon the front portion of the lever, whereby, when the micrometer screw 21 is moved in one direction, the shutters 14 and 15 will be simultaneously moved apart from one another, and, when said screw is moved in the opposite direction, said shutters will be simultaneously moved toward each other, expansion or contraction of the area of the aperture $w'$ being thereby conveniently effected. The purpose of the screw 22 is to effect such initial adjustment of the parts that when the pointer 24 coincides with the zero mark of the scale the adjoining edges of the shutters 14 and 15 will be in contact with one another and the aperture $w'$ will be completely closed.

The casing 1 contains a plano-convex field lens 30 and a plano-convex lens 31 for focusing the field upon the eye of the observer at $x$, the aperture $w$ being in the axial line of the lens 30, and the aperture $w'$ being laterally displaced in respect to said axis. A rhomboidal prism 32 covers one-half of the area of the field lens 30 and serves to divide the field and divert the rays of light from the aperture $w'$ into that half of the lens which the prism covers, the prism being so calculated that, by retardation of the light waves through the body of glass, the optical distance from the field lens direct to the aperture $w$ and indirectly through the prism to the aperture $w'$ is equal.

In order to use the instrument as a simple photometer it is first pointed toward an even white standard background such as a dense sheet of opal glass illuminated by diffused daylight, the shutters 14 and 15 are set at full aperture and the aperture $w$ is adjusted by the shutter 9 so as to make the two halves of the field appear exactly equal in luminosity when seen through the eyepiece aperture 3, which may be uncovered by swinging the color screen carrier to one side. If a wedge prism 35 be placed over the aperture $w$ it will bring into the respective half of the field an object suitably placed at one side of the white background, and if the shutters 14 and 15 are then adjusted by the micrometer screw 22 until the two halves of the field exactly match, the reading on the scale 25 will indicate the luminosity of the object relatively to the opal glass background. If the two halves of the field appear different in hue separate measurements should be taken successively through the red, green and blue-violet screens R, G and B, and the triplicate record will then indicate difference of hue at well as luminosity.

The accurate matching of the two halves of the field is made possible by using color screens transmitting narrow, isolated bands of the spectrum, as otherwise there would sometimes be a marked difference in the hue of the two halves of the field. It is for this purpose particularly, although also to make the readings interchangeable in some kinds of work with those obtained by a color meter of the character set forth in my previous patent, that the color screens used are identical in character with those used in said patented device.

Transparent objects, or solutions contained in transparent tanks, may be measured by placing them in the position of the prism 35, a holder 36 with spring clip 37 being used for this purpose. Adaptation to the comparison of different sources of illumination involves only such arrangements as are familiar to all experts in photometry.

I claim:—

1. The combination, in a photometer, of a casing having two light-receiving apertures, means for varying the area of one of said apertures, a field lens positioned to receive upon one portion the light rays from one of said apertures, and means for directing upon the other portion of the lens the light rays from the other aperture.

2. The combination, in a photometer, of a casing having two light-receiving apertures, means for varying the area of one of said apertures, a field lens positioned to receive upon one portion the light rays from one of said apertures, means for directing upon the other portion of the lens the light rays from the other aperture, and a lens for focusing said field upon the eye.

3. The combination, in a photometer, of a casing having two light-receiving apertures, means for varying the area of one of said apertures, a field lens positioned to receive upon one portion the light rays from one of said apertures means for directing upon the other portion of the lens the light rays from the other aperture, and three color screens susceptible of being interposed successively in the path of the transmitted light rays.

4. The combination, in a photometer, of a casing having two light-receiving apertures, means for varying the area of one of said apertures, a field lens positioned to receive upon one portion the light rays from one of said apertures, means for directing upon the other portion of the lens the light rays from the other aperture, a lens for focusing said field upon the eye, and three color screens susceptible of being interposed successively between said focusing lens and the eye.

5. The combination, in a photometer, of a casing having two light-receiving apertures, means for varying the area of one of said apertures, a measuring scale coöperating with said means, a field lens positioned to receive upon one portion the light rays from one of said apertures, and means for directing upon the other portion of the lens the light rays from the other aperture.

6. The combination, in a photometer, of a casing having two light-receiving apertures, means for varying the area of one of said apertures, a measuring scale coöperating with said means, a field lens positioned to receive upon one portion the light rays from one of said apertures, means for directing upon the other portion of the lens the light rays from the other aperture, and a lens for focusing said field upon the eye.

7. The combination, in a photometer, of a casing having two light-receiving apertures, means for varying the area of one of said apertures, a measuring scale coöperating with said means, a field lens positioned to receive upon one portion the light rays from one of said apertures, means for directing upon the other portion of the lens the light rays from the other aperture, and three color screens susceptible of being interposed successively in the path of the transmitted light rays.

8. The combination, in a photometer, of a casing having two light-receiving apertures, means for varying the area of one of said apertures, a measuring scale coöperating with said means, a field lens positioned to receive upon one portion the light rays from one of said apertures, means for directing the light rays from the other aperture upon the other portion of the lens, a lens for focusing said field upon the eye, and three color screens susceptible of being interposed successively between the said focusing lens and the eye.

9. The combination, in a photometer, of a casing having two light-receiving apertures, means for varying the area of one of said apertures, a field lens, and a rhomboidal prism partially covering said field lens and through which the rays of light from one of the light-receiving apertures are caused to pass.

10. The combination, in a photometer, of a casing containing a field lens and having two light-receiving apertures, one of which is laterally displaced in respect to the axis of the lens, and a rhomboidal prism partially covering said lens, through which prism the rays of light from said laterally displaced aperture are caused to pass, said prism being so calculated as to render the optical focus of the laterally displaced aperture the same as that of the other aperture.

11. The combination, in a photometer, of a casing having two light-receiving apertures, means for varying the area of one of said apertures, a field lens positioned to receive upon one portion the light rays from one of said apertures, means for directing upon the other portion of the lens the light rays from the other aperture, three color screens, disposed side by side, and a swinging carrier whereby said screens are susceptible of being interposed successively in the path of the transmitted light rays.

12. The combination, in a photometer, of a casing having two light-receiving apertures, means for varying the area of one of said apertures, a field lens positioned to receive upon one portion the light rays from one of said apertures, means for directing upon the other portion of the lens the light rays from the other aperture, a lens for focusing said field upon the eye, and a swinging carrier interposed between said focusing lens and the eye, and provided with three color screens disposed side by side.

13. The combination, in a photometer, of a casing having at one end two light-receiving apertures, and at the other end an eyepiece aperture, means for varying the area of one of the light-receiving apertures, a field lens positioned to receive upon one portion the rays of light from one of said apertures, means for directing upon the other portion of the lens the rays of light from the other aperture, three color screens, and a swinging carrier whereby said screens can be interposed successively in the path of the transmitted light rays.

14. The combination, in a photometer, of a casing having two light-receiving apertures, means for varying the area of each of said apertures, a field lens positioned to receive upon one portion the light rays from one of said apertures, and means for directing upon the other portion of the lens the light rays from the other aperture.

15. The combination, in a photometer, of a casing having two light-receiving apertures, a pair of shutters movable from and toward each other for varying the area of one of said apertures, a field lens positioned to receive upon one portion the light rays from one of said apertures, and means for directing upon the other portion of the lens the light rays from the other aperture.

16. The combination, in a photometer, of a casing having a light-receiving aperture, a pair of shutters for regulating the area of said aperture, pivoted carriers for said shutters, and means whereby the movement of one of said carriers is transmitted to the other in order to effect the simultaneous movement of the shutters.

17. The combination, in a photometer, of a casing having a light-receiving aperture, a shutter for varying the area of said aperture, a shutter-carrying arm, an adjusting screw engaging said arm, and a setting screw carried by said adjusting screw.

In testimony whereof, I have signed my name to this specification, in the presence of two subscribing witnesses.

FREDERIC E. IVES.

Witnesses:
GEO. MACLEAN,
TREADWELL CLEVELAND.